United States Patent [19]

Evans et al.

[11] Patent Number: 4,760,719
[45] Date of Patent: Aug. 2, 1988

[54] NON-KEY LOCKING CABLE LOCK FOR MARINE VESSEL

[76] Inventors: Daniel S. Evans, 1327 Tamarisk Dr., West Linn, Oreg. 97068; Lawrence P. Hall, 2601 SE. 170th St., Portland, Oreg. 97236

[21] Appl. No.: 84,128

[22] Filed: Aug. 12, 1987

Related U.S. Application Data

[63] Continuation-in-part of Ser. No. 945,000, Dec. 22, 1986, Pat. No. 4,693,098.

[51] Int. Cl.4 .............................................. E05B 73/00
[52] U.S. Cl. ............................................ 70/18; 70/34
[58] Field of Search .................. 70/18, 32, 33, 34, 30, 70/38 R, 38 A, 38 B, 38 C, 39, 49, 234, 57, 58, 62; 292/43, 39

[56] References Cited

U.S. PATENT DOCUMENTS

| | | | |
|---|---|---|---|
| 2,164,981 | 1/1938 | Falk | 70/33 |
| 3,823,584 | 7/1974 | Gill | 70/38 A |
| 3,879,721 | 4/1975 | Yereance | 70/49 |

*Primary Examiner*—Robert L. Wolfe
*Attorney, Agent, or Firm*—Jerome J. Norris

[57] ABSTRACT

A cable-lock device for securing an outboard motor vehicle to a marine vessel, wherein a cable with a phallic head inserted into a lock member, which comprises a sliding latch plate with a semi-circular opening which aligns with a groove in the phallic head to form a lock.

5 Claims, 2 Drawing Sheets

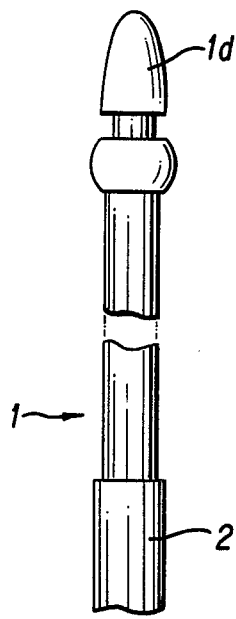
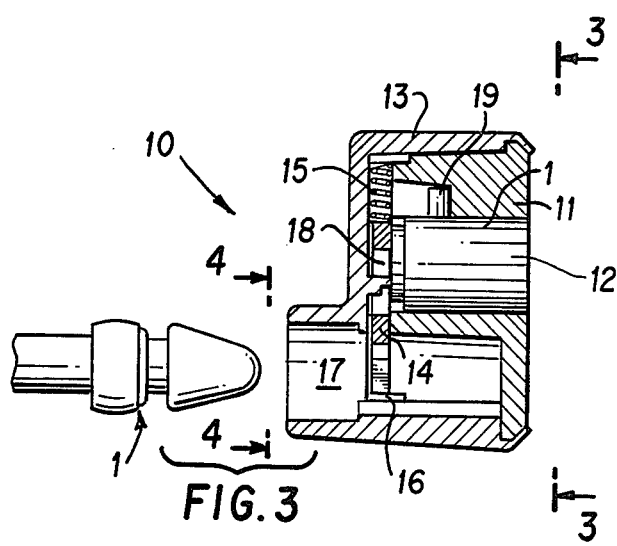
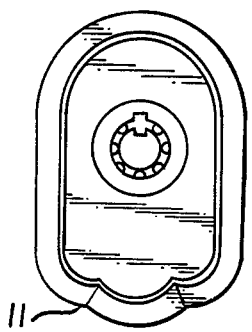
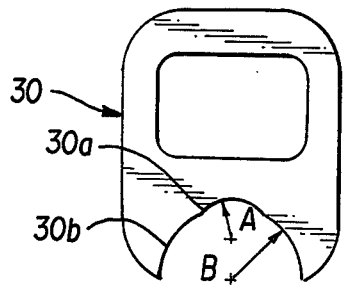
FIG. 1  FIG. 3  FIG. 4  FIG. 5
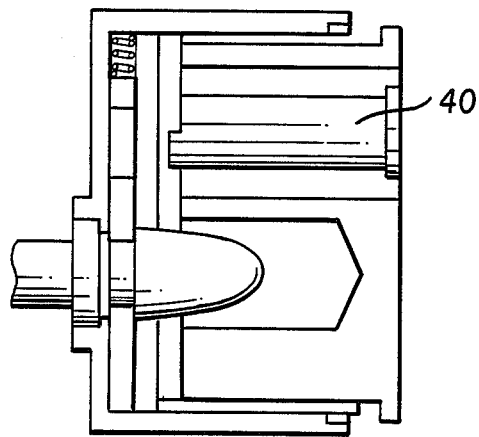
FIG. 6

NON-KEY LOCKING CABLE LOCK FOR MARINE VESSEL

BACKGROUND OF THE INVENTION

1. Field of the Invention:

The invention generally pertains to a locking system for securing marine vessels to stationary structures, and is a continuation in part of U.S. patent application No. 945,000 filed on Dec. 22, 1986, now U.S. Pat. No. 4,693,098.

In particular, the invention pertains to flexible cable-type locking systems for securing marine vessels to stationary structures, in order to prevent theft of the vessel.

2. Brief Description of the Prior Art:

Older types of locks for securing land vehicles such as bicycles have been padlocks which have an elongated clasp which interlocks the spokes of the bicycle wheel with portions of the frame of the bicycle; however, this type of locking system could not deter theft of the land vehicle nor a marine vessel from one who was disposed to lifting the vehicle or vessel and carrying it away.

More recent types of locks for securing land vehicles such as bicycles are cable-type locks which are anchored to part of the frame of the bicycle and have a cable of adequate length to be secured around a stationary structure such as a tree, post or the support member of a bicycle rack at the location where the bicycle is to be left. The locks so provided are elongated flexible cables which carry locking elements on its opposite ends, and which can be extended through the frame and around a stationary structure, and the ends locked together to secure the bicycle to the structure.

In cable locking systems having the cable secured to some tubular or chamber part of the bicycle frame, such as the handlebar, it is necessary to use a key during the procedure of locking-up the bicycle to a stationary structure, and it is, also necessary to use a key for unlocking the bicycle. Further, the rider must also use a key to simply remove the cable from a tubular structure of the bicycle frame, such as the handlebar.

These cable locking systems, which require frequent usages of a key make it more difficult and time consuming to attach and remove the bicycle from a stationary structure, and they would not be at all suitable for securing or mooring marine vessels.

SUMMARY OF THE INVENTION

It is a general object of the invention to provide a simple cable marine vessel locking system or device that allows an outboard motor to be quickly secured to the transom of a marine vessel.

It is a further object of the invention to provide a cable outboard motor locking system which does not require a key during the procedure of locking a vehicle, such as an outboard motor to a transom of a marine vessel.

A yet further object of the invention is to provide an outboard motor locking system which does not require the use of a key to remove the cable from a tubular part such as a frame, prior to the procedure of locking-up the outboard motor to a transom of a marine vessel without the use of a key.

These and other objects and advantages of the invention will become more apparent in the detailed description and accompanying drawings.

BRIEF DESCRIPTION OF THE DRAWINGS

A preferred, but non-limiting, embodiment is illustrated in the drawings, where:

FIG. 1 is a view of a solid phallic-head fastened to an end of stranded steel cable to form a length of cable which forms part of the locking device.

FIG. 3 is a cross sectional view of the lock and its internal mechanisms.

FIG. 4 is a view taken along line 3—3 of FIG. 3.

FIG. 5 is an enlarged isolated view in perspective of the sliding latch plate taken along line 4—4 of FIG. 3.

FIG. 6 is a cross sectional view of the lock and its internal mechanisms with the solid phallic head portion of the folded cable locked into the inner body of the lock portion of the cable marine vessel locking device.

DETAILED DESCRIPTION OF THE INVENTION

Figure 2:
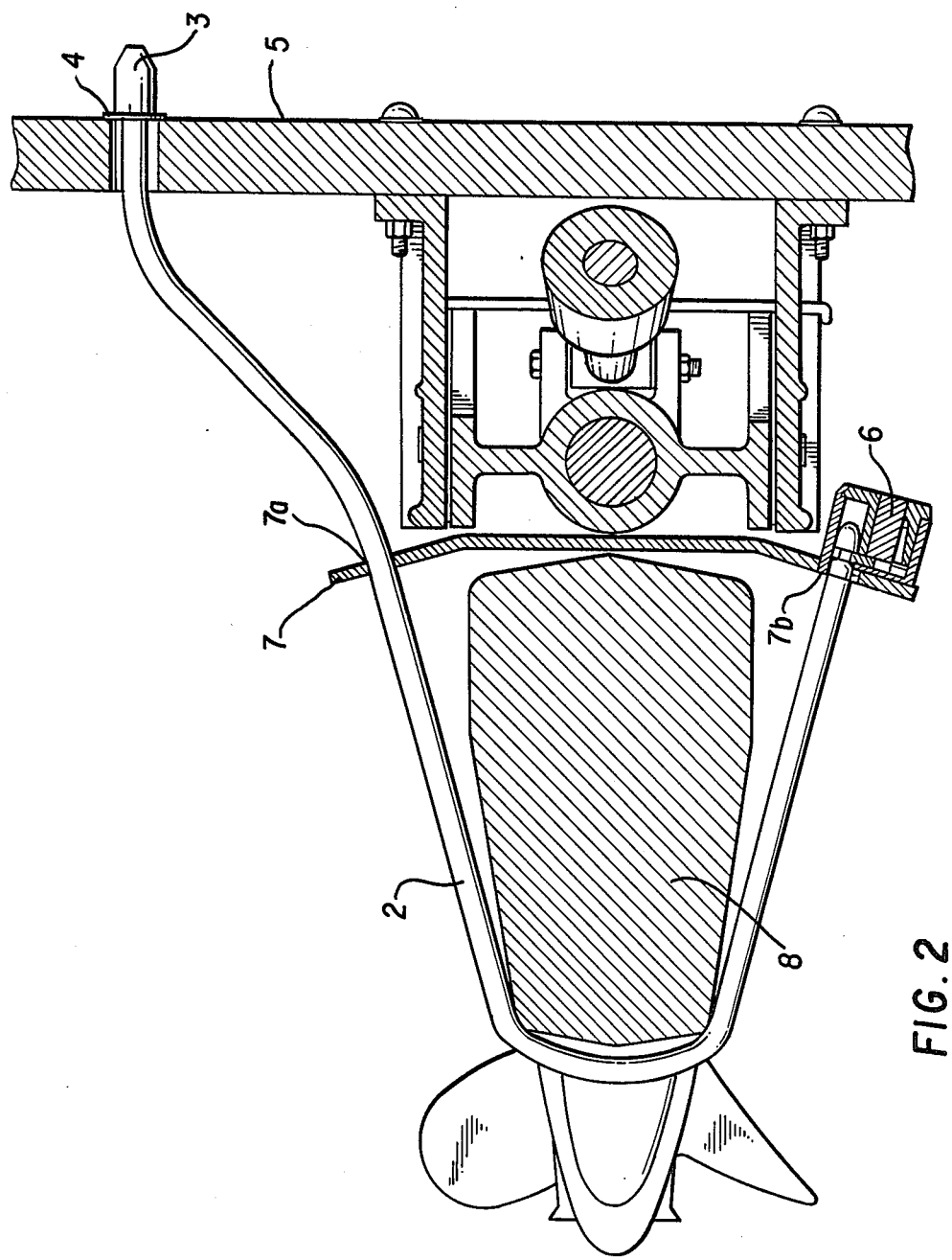
FIG. 2 is a perspective top view showing an outboard motor secured to the transom of a marine vessel using the locking system of the invention.

In referring to the drawings, it can be seen from FIG. 1 that the cable 1 is composed of a solid steel alloy phallic head (1d). The alloy phallic head is fastened together with a length of stranded steel cable at another end (2) to form a length of cable.

Affixed to the length of cable as shown in FIG. 2 is a solid ferrule 3. A large washer 4, together with the ferrule, which is larger in diameter than the opening in the transom 5, prevents the trailing end of the cable from passing completely through the opening. The lock mechanism 6, is mounted onto one end of a transverse steel plate 7, through which two holes have been bored. A hole 7a on one side of the steel plate accommodates the passage of the cable, and a hole 7b at the opposite end of the steel plate accommodates the opening of the lock mechanism, to allow the phallic cable head to be inserted into the opening of the lock mechanism in order to engage the lock plate. When securing an outboard motor to the transom of a marine vessel, the end of the steel plate that is not accommodating the lock mechanism is inserted between the steering shaft or vertical axis assembly and the drive shaft housing 8. The end of the cable equipped with the phallic head is inserted through an opening in the transom. Since the ferrule is larger than the opening in the transom, the trailing end of the cable is prevented from passing completely through the opening. The phallic head end of the cable is: passed through the open hole in the steel plate 7a; looped around the drive shaft housing 8; and plugged into the opening 7b of the lock mechanism to engage the sliding latch plate on the locking mechanism.

FIG. 3 depicts locking mechanism (10), comprised of inner body (11), which accommodates lock plug cylinder (12). The outer housing (13) of said locking mechanism receives sliding latch plate (14), which is held down, biased or tensioned by spring (15). Sliding latch plate (14) and spring (15) are protected or safe guarded against potential drilling or cut-through by insert plate (16), which is made of a hardened steel alloy. When outer housing (13) receives inner body (11) and the two pieces are fastened by well known conventional means, the lock is formed. An opening (17), in the lock receives the cable phallic head which then engages the sliding latch plate in the arc (a) formed by radius 30a of FIG. 5 and forces it upwardly out of the way in a direction opposing spring (15). After the cable phallic head is inserted enough to pass a portion of the diameter of the phallic head into arc (a) and raise sliding latch plate (14), the encircled groove of lesser diameter of the phallic head end becomes aligned with the portion of the circle formed by arc (b) of the sliding plate when spring (15) abruptly becomes unopposed. The cable phallic head is then secured inside of the lock, as shown in FIG. 6.

In order to release cable phallic head from the lock, sliding latch plate (14) is removed from the groove in the cable phallic head. This is accomplished by inserting a key into lock plug cylinder (12) in a direction opposite from and above the direction in which the cable phallic head is inserted. When the inserted key (not shown) is turned, cam (18) lifts sliding latch plate (14) away from the groove and in the direction opposing spring (15). The phallic head is then free, and can be removed from the lock. The outer cylinder part of lock plug cylinder (12) is prohibited from turning freely by retaining pin (19), which allows the plug portion of (12) to turn independent of the cylinder portion, thereby allowing cam (18) to rotate.

Retaining pin (19) also prohibits lock plug cylinder (12) from being removed from inner body (11) after the lock components are assembled and fastened together. When the cable phallic head is removed from the lock opening and the key inserted into lock plug cylinder (12) is no longer rotated in a direction opposing spring (15), spring (15) is unopposed and sliding latch plate (14) and cam (18) are returned to their positions of rest.

The sliding latch plate component of the lock is shown in FIG. 5. In the operation of the cable locking device, the dual radii portions (30a) and (30b) of the lower semi-circular open portion of the latch plate (30) are of particular importance. The shape of dual radius portions (30a) and (30b) allow the cable phallic head to push the sliding latch out of the way in an upwardly direction against spring (15). The radius (30a) of arc (a) is formed from center point A, whereas the radius (30b) of arc (b) is formed from center point B. A circle formed from the center point B is approximately 40% larger than a circle formed from the radius from point A that inscribes arc (a). Putting it another way, the radius from a midpoint which forms the semi-circle is less than the radius from the same point that forms the arc. When the cable phallic head is inserted to pass a portion of the diameter of the head into arc (a) of the semi-circular opening and raise the sliding latch plate, the encircled groove of lesser diameter of the phallic head becomes aligned with the portion of the circle formed by arc (b) of the sliding latch plate, thereby allowing quick locking to take place as shown in FIG. 6 without the aid of an auxiliary, such as a key.

In order to release the cable phallic head from the locked position shown in FIG. 6, a key is required. The key (not shown) is inserted into the opening of the lock plug rotatable cylinder (40) from a direction opposite from the direction in which the cable phallic head is inserted and rotated until the cam affixed thereto lifts the sliding latch plate from the groove in a direction opposing the spring.

While the non-key locking cable device for securing outboard motors to marine vessels described by reference to particular embodiments, it is to be understood that many variations can be made in the invention device, without departing from the invention scope.

What is claimed is:

1. A non-key locking cable-lock device for securing an outboard motor to a marine vessel without a key comprising:
   a cable passed through an opening in a transom and prevented from completely passing through said opening by a solid ferrule attached at one end and having a phallic head with grooves therein at another end that is passed through a hole on one side of a steel plate on a marine vessel, and is looped around a drive shaft housing of said vessel, and passed through another hole at an opposite end of said plate to which the opening of a locking mechanism is affixed;
   said locking mechanism comprising a sliding latch plate biased in a rest position by a spring, said latch plate having in its lower part a semi-circular opening with an arc at the midpoint of the semi-circle into which said phallic head is inserted to push the latch plate upwardly against said spring until the groove in said phallic head plug is aligned with the semi-circle, said mechanism having a lock plug rotatable cylinder at the opposite end and above said semi-circular opening to release said plug upon rotation of a key inserted in an opening of said lock plug rotatable cylinder.

2. The cable-lock device of claim 1, wherein said spring and said sliding latch plate are protected from cut-through by an insert protective plate.

3. The cable-lock device of claim 1, wherein a retaining pin member prohibits an outer cylinder part of said lock plug cylinder from turning freely, and allows the plug portion to turn independently of the cylinder portion, thereby allowing a cam to rotate.

4. The cable-lock device of claim 1, wherein a retaining pin member prohibits said lock plug cylinder from being removed from an inner body of said lock after said lock components are assembled and fastened.

5. The cable-lock device of claim 1, wherein a cam is affixed to said lock plug rotatable cylinder to lift said sliding latch plate from said groove in a direction opposing said spring.

* * * * *